(12) United States Patent
Bortz et al.

(10) Patent No.: US 8,207,511 B2
(45) Date of Patent: Jun. 26, 2012

(54) PHOTOLUMINESCENT FIBERS, COMPOSITIONS AND FABRICS MADE THEREFROM

(75) Inventors: Timothy E. Bortz, Chester, NH (US); Satish Agrawal, Concord, MA (US); James G. Shelnut, Lancaster, MA (US)

(73) Assignee: Performance Indicator, LLC, Lowell, MA (US)

( * ) Notice: Subject to any disclaimer, the term of this patent is extended or adjusted under 35 U.S.C. 154(b) by 302 days.

(21) Appl. No.: 12/479,514

(22) Filed: Jun. 5, 2009

(65) Prior Publication Data

US 2009/0302237 A1    Dec. 10, 2009

Related U.S. Application Data

(60) Provisional application No. 61/129,126, filed on Jun. 5, 2008.

(51) Int. Cl.
  *G01T 1/04*   (2006.01)
  *C09K 11/06*  (2006.01)
  *B32B 9/00*   (2006.01)
  *G01J 1/58*   (2006.01)

(52) U.S. Cl. .......... 250/473.1; 252/301.16; 428/392; 250/486.1

(58) Field of Classification Search .......... 250/486.1, 250/484.4, 462.1, 473.1; 252/301.16; 428/392
See application file for complete search history.

(56) References Cited

U.S. PATENT DOCUMENTS

| | | | |
|---|---|---|---|
| 4,124,973 A | 11/1978 | Hense et al. | |
| 4,211,813 A | 7/1980 | Gravisse et al. | |
| 5,424,006 A | 6/1995 | Murayama et al. | |
| 5,674,437 A | 10/1997 | Geisel | |
| 5,885,483 A | 3/1999 | Hao et al. | |
| 6,117,362 A | 9/2000 | Yen et al. | |
| 6,162,539 A | 12/2000 | Shimizu et al. | |
| 6,267,911 B1 | 7/2001 | Yen et al. | |
| 6,307,207 B1 | 10/2001 | Burbank | |
| 6,753,096 B2 * | 6/2004 | Duggal et al. | 428/690 |
| 7,338,877 B1 | 3/2008 | Meyer et al. | |
| 7,378,675 B2 | 5/2008 | Ross et al. | |
| 7,531,235 B2 * | 5/2009 | Den Toonder et al. | 428/375 |
| 2003/0122107 A1 * | 7/2003 | Pourdeyhimi et al. | 252/301.36 |
| 2008/0092938 A1 * | 4/2008 | Majumdar et al. | 136/200 |

OTHER PUBLICATIONS

International Search Report dated Jul. 28, 2009 for PCT/US09/46476. Applicant: Performance Indicator LLC.
Written Opinion dated Jul. 28, 2009 for PCT/US09/48476. Applicant: Performance Indicator LLC.

* cited by examiner

*Primary Examiner* — David Porta
*Assistant Examiner* — Faye Boosalis
(74) *Attorney, Agent, or Firm* — Burns & Levinson LLP; Orlando Lopez; Shahid Hasan

(57) ABSTRACT

Disclosed are photoluminescent fibers containing photoluminescent phosphorescent materials and photoluminescent fluorescent materials whose emission signature lies partly or fully in the infrared region of the electromagnetic spectrum. Also disclosed are the use of the inventive fibers, fabrics made therefrom, and objects containing the fiber.

12 Claims, 5 Drawing Sheets

PHOTOLUMINESCENT FIBERS, COMPOSITIONS AND FABRICS MADE THEREFROM

This application claims priority under 35 U.S.C. §120 to U.S. Provisional Patent Application Ser. No. 61/129,126, filed on Jun. 5, 2008, the contents of which is incorporated herein in its entirety for all purposes.

FIELD OF THE INVENTION

The present invention relates generally to the field of photoluminescent fibers. In particular, the present invention relates to photoluminescent phosphorescent fibers whose emission signature lies partly or fully in the infrared region of the electromagnetic spectrum. The present invention also relates to the use of the inventive fibers, fabrics made therefrom, and objects containing the fiber.

BACKGROUND OF THE INVENTION

Photoluminescent materials and compositions that contain photoluminescent phosphorescent materials with emissions in the visible region of the electromagnetic spectrum have been disclosed. For example, metal sulfide pigments which contain various elemental activators, co-activators and compensators have been prepared which absorb at 380-400 nm and have an emission spectrum of 450-520 nm.

Recently, phosphorescent materials that have significantly higher persistence, up to 12-16 hours, have been reported. Such phosphors generally comprise an alkaline earth aluminate host matrix and can be represented, for example, by $MAl_2O_3$ or $MAl_2O_4$ wherein M can comprise a plurality of metals, at least one of which is an alkaline earth metal, such as calcium, strontium, barium and magnesium. These materials generally deploy Europium as an activator and can additionally also contain one or more rare earth materials as co-activators. Examples of such high intensity and high persistence phosphors can be found, for example, in U.S. Pat. No. 5,424,006, U.S. Pat. No. 5,885,483, U.S. Pat. No. 6,117,362 and U.S. Pat. No. 6,267,911 B1.

Photoluminescent compositions comprising only phosphorescent materials with emissions in the infrared region have been reported. Such phosphorescent materials consist of doped ZnCdS. These materials have been shown to have observable tail emissions into the visible region and consequently would not have utility for clandestine markings. These materials have neither been used for clandestine detection or for detection applications wherein activation and detection can be decoupled spatially and temporally.

Photoluminescent compositions which contain combinations of ZnS phosphorescent materials and fluorescent materials have also been disclosed. However the use of these fluorescent materials has been limited to either altering the charging (activating) radiation or altering the visible daylight or visible emission color. Use of ZnS with fluorescent materials is generally limited to altering the color observed in daylight.

Photoluminescent compositions have also been contemplated which contain a series of fluorescent materials. One of the fluorescent materials absorbs and emits radiation which is then absorbed by a companion fluorescent material which then emits radiation to give a final infrared emission. As can be appreciated, use of fluorescent materials does not provide for any continued emission once the absorbable radiation is removed. These compositions have no provision for continued emission of infrared radiation that can be detected at a future time, that is, after activation has ceased. The need for activating the materials immediately prior to detection will also require possession of activating equipment at site of detection thereby limiting flexibility and/or portability and thus will not permit stealth detection.

Prior art in the field of photoluminescent fibers has focused entirely on visible emission such as U.S. Pat. No. 5,674,437; U.S. Pat. No. 6,162,539, U.S. Pat. No. 7,338,877 and U.S. Pat. No. 6,307,207B1. No work has been reported for creating photoluminescent fibers with emissions partly or fully in the infrared region of the electromagnetic spectrum.

Although methods for uniquely marking and identifying objects have received thought and attention, such methods do not enable stealth detection. In many cases, such as, for example, identification of friendly forces in the combat theater, the identifying markings need to be unobservable by enemy personnel, or, for example, in anti-counterfeit applications wherein, the identifying markings need to be hidden to avoid detectability of such markings by counterfeiters. Clandestine or stealth identification, wherein the emissions from the photoluminescent markings are not ordinarily observable by a human observer (without specific detection equipment), but detectable by friendly forces, and further wherein activation is not required during detection (such activation being potentially detectable by others), will be of high value in the combat theater for stealth detection of combat equipment, or personnel. Such markings will also be of value for stealth combat operations, or for covertly marking enemy targets for tracking or elimination.

There is no mention in the literature of fibers that photoluminesce fully or partially in the infrared region of the electromagnetic spectrum. Therefore there are no fabrics which contain these fibers that could be used for clandestine or stealth identification, or where these fibers could be used for authentication purposes.

As can be seen from the above discussion, there is a need for photoluminescent fibers, fabrics made therefrom and objects containing the fiber which emit partly or fully in the infrared region of the electromagnetic spectrum useful for identification and detection of objects. Furthermore there is also a need for photoluminescent fibers, fabrics made therefrom and objects containing the fiber that enable the act of detection of the object to be decoupled spatially from the object and/or its activation source, that is, detection can occur away from the object and/or its activation source, and also wherein, detection can be decoupled temporally from activation, that is, detection can occur at a time later than the activation. It should be noted that decoupling of activation and detection also allows for flexibility and portability in the act of detection, allowing for clandestine or stealth identification and detection.

SUMMARY OF THE INVENTION

The present invention provides for photoluminescent fibers containing photoluminescent phosphorescent materials and photoluminescent fluorescent materials whose emission signature lies partly or fully in the infrared region of the electromagnetic spectrum. As well, the invention provides for photoluminescent fibers containing photoluminescent phosphorescent materials and photoluminescent fluorescent materials whose emission signature lies partly or fully in the infrared region of the electromagnetic spectrum which are high in intensity and high in persistence. The present invention also provides for fabrics that incorporate these fibers either as the only fiber or interwoven with non-photoluminescent fibers.

A key advantage of these photoluminescent fibers, such as those described below, is that they can be activated or excited without requiring specialized sources. That is, the photoluminescent fibers can be charged with naturally-occurring illumination essentially for most of the day be it during the morning, noon, or evening, as well as on cloudy days. The present invention therefore eliminates the need for activating equipment at the point of identification or detection. Further, with the use of high emission intensity and persistent photoluminescent compositions, such as those described below, methods of identifying or detecting objects can be practiced also at nighttime, that is, long after activation has ceased, and at great distances.

In a first aspect, the present invention provides for photoluminescent fibers containing one or more photoluminescent phosphorescent materials and one or more photoluminescent fluorescent materials wherein the one or more photoluminescent phosphorescent materials are selected so that they absorb and emit electromagnetic energies when charged or activated by either electromagnetic radiation from an excitation source incident upon the composition, or by emission of another photoluminescent material, or both, and wherein the one or more photoluminescent fluorescent materials are selected so that they absorb the emission from the one or more photoluminescent materials and emit electromagnetic energies to give a selected emission signature, such that some or all of the emission signature lies in the infrared portion of the electromagnetic spectrum, the photoluminescent materials being selected so that the emission of one of the photoluminescent materials overlaps with the absorbance of another of the photoluminescent materials, wherein the selected emission signature is the emission from one or more of the selected photoluminescent fluorescent materials, such emission being essentially unabsorbed by any of the other photoluminescent materials.

In a second aspect, the present invention provides for a fiber containing a core and a sheath, wherein the core contains photoluminescent phosphorescent materials and optionally photoluminescent fluorescent materials and the sheath contains photoluminescent fluorescent materials.

In a third aspect, the present invention provides for a fiber containing a core and a sheath, wherein the core contains both photoluminescent phosphorescent materials and photoluminescent fluorescent materials and the sheath contains materials that shift the color of the fiber, mask the fiber, protect the fiber or a combination thereof.

In a fourth aspect, the present invention provides for a fiber containing a core, a sheath and a second sheath, wherein the core contains photoluminescent phosphorescent materials and optionally photoluminescent fluorescent materials and the sheath contains photoluminescent fluorescent materials and the second sheath contains photoluminescent fluorescent materials.

In a fifth aspect, the present invention provides for a fiber containing a core, a sheath and a second sheath, wherein the core contains photoluminescent phosphorescent materials and optionally photoluminescent fluorescent materials and the sheath contains photoluminescent fluorescent materials and the second sheath contains materials that shift the color of the fiber, mask the fiber, protect the fiber or a combination thereof.

In a sixth aspect, the present invention provides for a fiber containing a core, a sheath and a second sheath, wherein the core is reflective of photoluminescent emission, a strengthening fiber, a conductive fiber or an optical fiber and the sheath contains photoluminescent phosphorescent materials and optionally photoluminescent fluorescent materials and the second sheath contains photoluminescent fluorescent materials.

In a seventh aspect, the present invention provides for a fiber containing a core, a sheath, a second sheath and a third sheath, wherein the core contains photoluminescent phosphorescent materials and optionally photoluminescent fluorescent materials, the sheath contains photoluminescent fluorescent materials, the second sheath contains photoluminescent fluorescent materials and the third sheath contains photoluminescent fluorescent materials.

In an eighth aspect, the present invention provides for a fiber containing a core, a sheath, a second sheath and a third sheath, wherein the core contains photoluminescent phosphorescent materials and optionally photoluminescent fluorescent materials, the sheath contains photoluminescent fluorescent materials, the second sheath contains photoluminescent fluorescent materials and the third sheath contains materials that shift the color of the fiber, mask the fiber, protect the fiber or a combination thereof.

In a ninth aspect, the present invention provides for a fiber containing a core, a sheath, a second sheath and a third sheath, wherein the core is reflective of photoluminescent emission, a strengthening fiber, a conductive fiber or an optical fiber, the sheath contains photoluminescent phosphorescent materials and optionally photoluminescent fluorescent materials, the second sheath contains photoluminescent fluorescent materials and the third sheath contains materials that shift the color of the fiber, mask the fiber, protect the fiber or a combination thereof.

In a tenth aspect, the present invention provides for fabrics made from the aforementioned aspects.

In an eleventh aspect, the present invention provides for methods of stealth detection and identification using the fibers and fabrics of the aforementioned aspects.

DETAILED DESCRIPTION OF THE INVENTION

Figure 1:
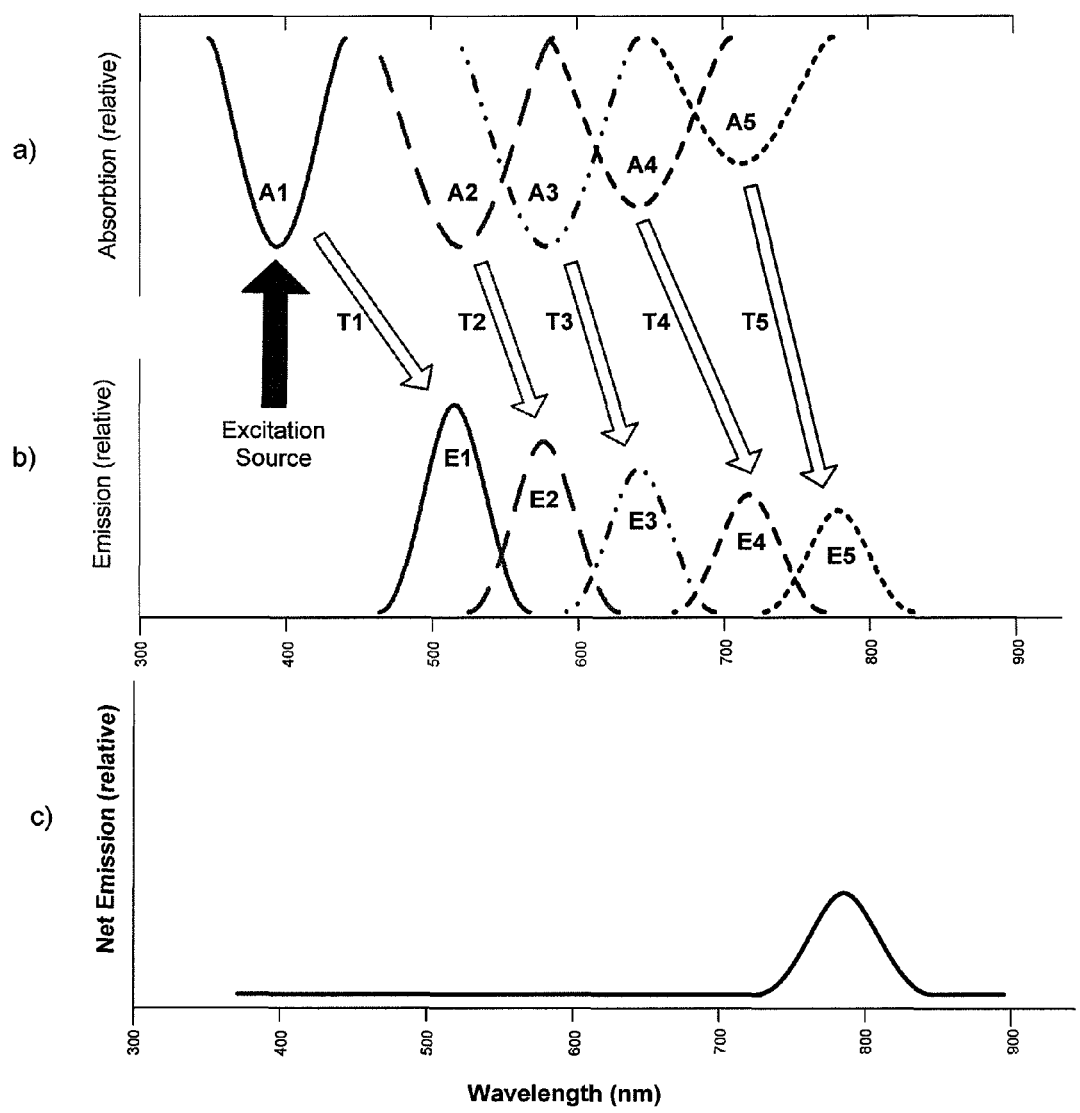
FIG. 1 illustrates a shift in emission spectra resulting from incorporation of photoluminescent phosphorescent and photoluminescent fluorescent dyes. Chart a) is the representative absorbance spectra, b) is the representative emission spectra and c) is the representative net emission spectra resulting from the inventive composition. As illustrated a photoluminescent phosphorescent material absorbs radiation at A1 from an excitation source. The photoluminescent phosphor can continuously emit radiation E1 which overlaps with the absorption spectra A2 which emits radiation at E2. E2 again is designed to overlap with the absorption A3 which emits radiation E3. This process can continue until a final desired emission is obtained, in this case E5. As can be seen from chart c) the composition is designed to emit radiation at approx. 780 nm.
Figure 2:
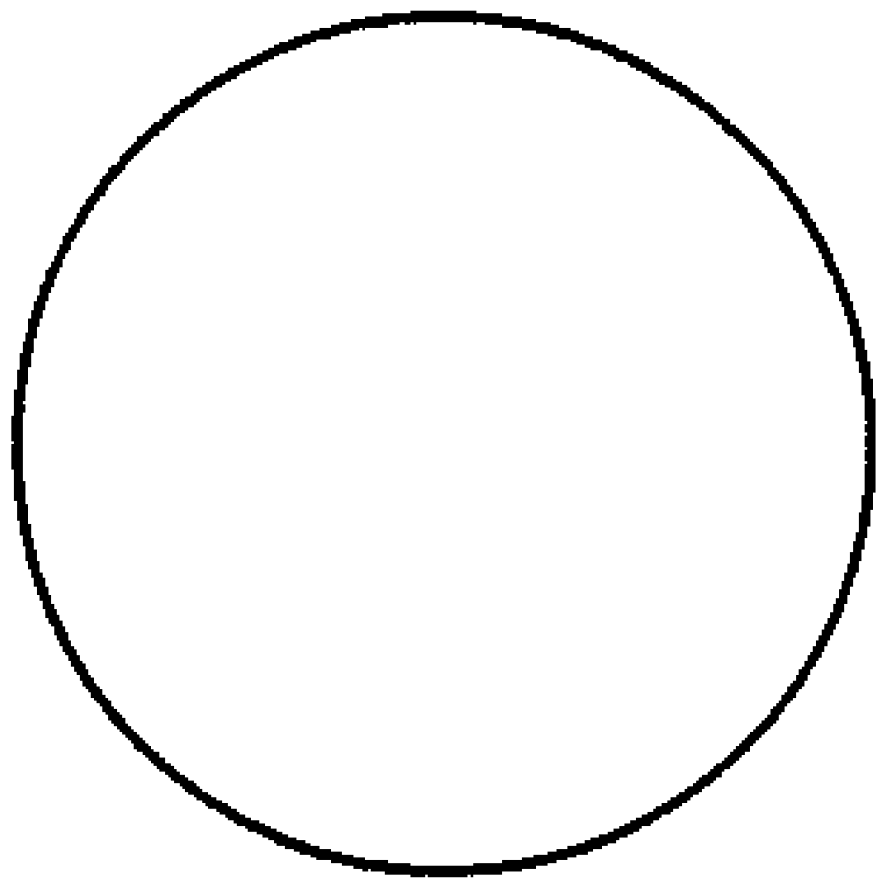
FIG. 2 illustrates a singled stranded fiber of the current invention which contains the photoluminescent phosphorescent and photoluminescent fluorescent materials.
Figure 3:
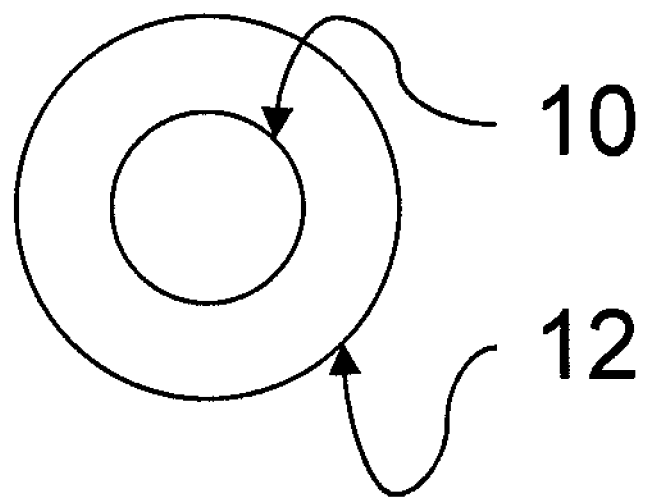
FIG. 3 illustrates a fiber of the current invention with a core (10) and a sheath (12).
Figure 4:
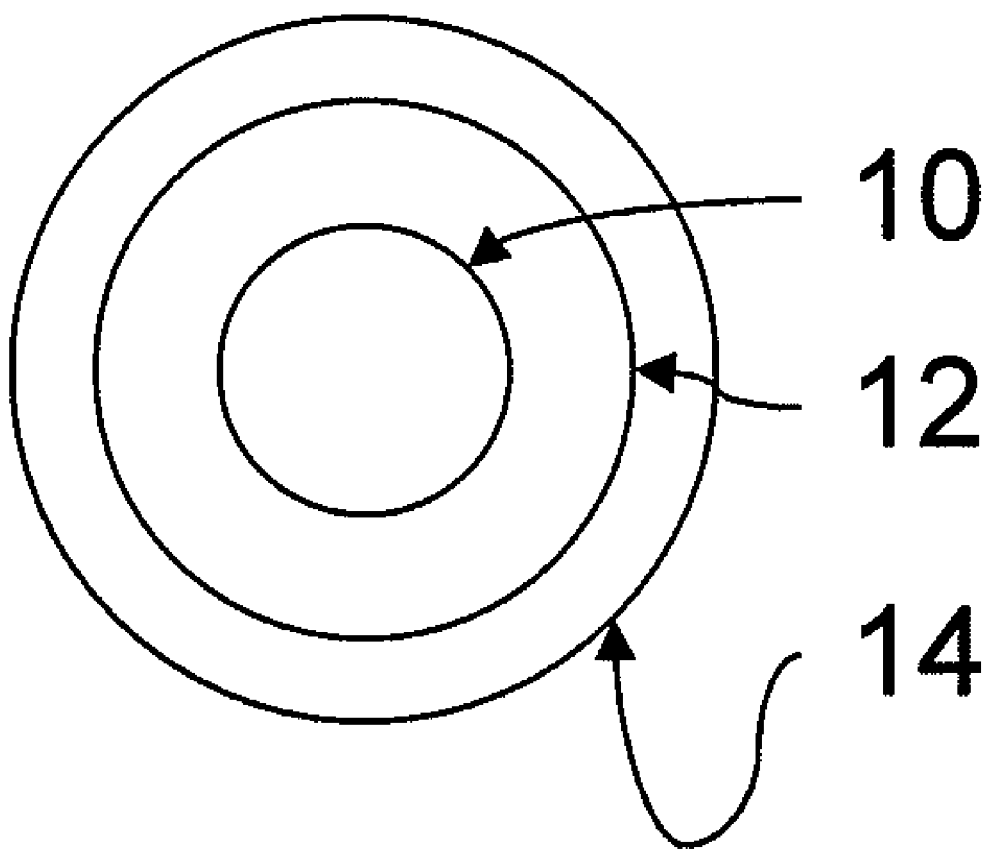
FIG. 4 illustrates a fiber of the current invention with a core (10), a sheath (12) and a second sheath (14).
Figure 5:
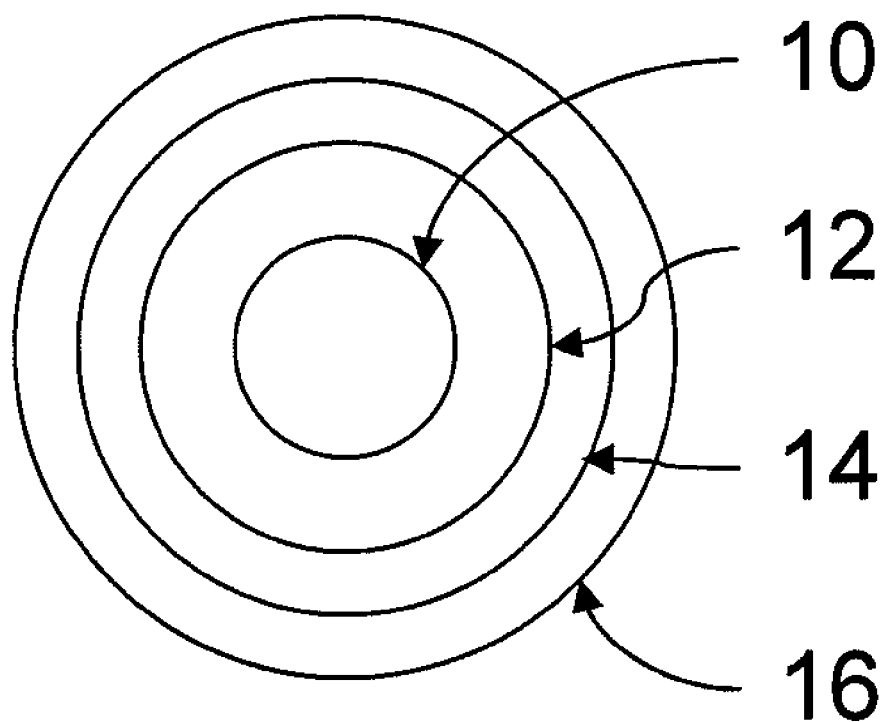
FIG. 5 illustrates a fiber of the current invention with a core (10), a sheath (12), a second sheath (14) and a third sheath (16).

It has been found that photoluminescent compositions comprising photoluminescent phosphorescent and photoluminescent fluorescent materials whose emission signature lies partly or fully in the infrared region of the electromagnetic spectrum when made into fibers, fabrics made from the fibers or objects incorporating the fibers permit identification or detection. A key advantage of the use of the photoluminescent phosphorescent fibers is that they can be activated or excited without requiring specialized sources. That is, they can be charged with naturally-occurring illumination essentially for most of the day, be it during the morning, noon, or evening, as well as on cloudy days in addition to artificial sources such as metal halide lamps. Whether activated by naturally or artificially occurring illumination the present invention eliminates the need for having activating equipment at the point of identification or detection and enables detection to be practiced at daytime or nighttime and at locations away from the fiber, and/or its detection source as well as after the activation of the fiber has ceased. Further, with the use of high luminous intensity and persistent photoluminescent phosphorescent compositions, such as those described below, fiber identification or detection at daytime or nighttime can be practiced at great distances from the fiber and/or its activation source and long after activation has ceased.

Unless otherwise noted, percentages used herein are expressed as weight percent.

As used herein, a "luminescent" material is a material capable of emitting electromagnetic radiation after being excited into an excited state.

As used herein, a "photoluminescent composition" is defined as an admixture of materials which is capable of emitting electromagnetic radiation from electronically-excited states when excited or charged or activated by electromagnetic radiation.

As used herein, a "fluorescent" material is a material that has the ability to be excited by electromagnetic radiation into an excited state and which releases energy in the form of electromagnetic radiation rapidly, after excitation. Emissions from fluorescent materials have no persistence, that is, emission essentially ceases after an excitation source is removed. The released energy may be in the form of UV, visible or infrared radiation.

As used herein, a "phosphorescent" material is a material that has the ability to be excited by electromagnetic radiation into an excited state, but the stored energy is released gradually. Emissions from phosphorescent materials have persistence, that is, emissions from such materials can last for seconds, minutes or even hours after the excitation source is removed. The released energy may be in the form of UV, visible or infrared radiation.

"Luminescence", "phosphorescence" or "fluorescence" is the actual release of electromagnetic radiation from a luminescent, phosphorescent or fluorescent material, respectively.

As used herein "Luminous Intensity" is defined as a measure of emitted electromagnetic radiation as perceived by a "standard observer" (see e.g. C. J. Bartelson and F. Grum, *Optical Radiation Measurements, Volume 5—Visual Measurements* (1984), incorporated herein by reference) as mimicked by a photopic detector, such as an IL 1700 Radiometer/Photometer with high gain luminance detector by International Light Co of Massachusetts.

As used herein "emission intensity" is defined as a measure of the photoluminescent emissions from a photoluminescent object, such measurement being made with any device capable of measuring the emission strength either photometrically or radiometrically, such emissions being either visible or infrared or both.

As used herein "persistence" is defined as the time it takes, after discontinuing irradiation, for photoluminescent emissions emanating from a photoluminescent object to decrease to the threshold detectability with a suitable detection apparatus.

As used herein "high persistence" is defined to mean that the time it takes, after discontinuing irradiation, for photoluminescent emissions emanating from a photoluminescent object to decrease to the threshold detectability with a suitable detection apparatus is greater than five hours.

As used herein, "electromagnetic radiation" refers to a form of energy containing both electric and magnetic wave components which includes ultraviolet (UV), visible and infrared (IR) radiation.

As used herein, an "emission signature" refers to the specific emission spectrum of the photoluminescent composition as a result of activation, such emission being characterizable by wavelength and amplitude.

As used herein "radiation incident upon the photoluminescent composition" refers to the activating or charging electromagnetic radiation wherein at least some of the incident electromagnetic radiation will initially excite one or more of the photoluminescent materials.

As used herein, "Stokes shift" refers to the difference in wavelength between the excitation or activation wavelength and the emission wavelength of photoluminescent materials.

As used herein, a "liquid carrier medium" is a liquid that acts as a carrier for materials distributed in a solid state and/or dissolved therein.

As used herein, a "stabilizing additive" is a material added to a composition so as to uniformly distribute materials present as particulates, to prevent agglomeration, and/or prevent settling of solid material in a liquid carrier medium. Such stabilizing additives generally comprise dispersants, and/or rheology modifiers.

As used herein, "rheology modifiers" are those substances which generally can build viscosity in liquid dispersion compositions, that is, compositions containing particulate matter distributed in a liquid carrier, thereby retarding settling of such particulate materials, while at the same time significantly lowering viscosity upon application of shear, to enhance smooth applicability of such compositions onto objects.

As used herein, "dispersing agents" are those substances which are used to maintain dispersed particles in suspension in a composition in order to retard settling and agglomeration.

As used herein, "photostabilizers" refers to components of the composition designed to retard deterioration, degradation or undesirable changes in compositional and/or visual properties as a result of actions by electromagnetic radiation.

As used herein "clandestine or stealth identification" refers to the act of identifying or detecting a fiber, a fabric made therefrom or an object containing the fiber, wherein the emissions from the photoluminescent markings used for such identification or detection are ordinarily not visible to a human observer either during daytime or nighttime and wherein the emissions from such photoluminescent markings require specific detection equipment for observation for the purpose of identification or detection, and further wherein, activation or charging is not required during detection.

As used herein "stealth marking" refers to a photoluminescent marking, including fibers, fabrics made therefrom, and objects containing the fiber, whose daylight color has been formulated so as not to be distinguishable from the surrounding area.

As used herein "spatially and temporally decoupled" means that detection can be practiced after the activation has ceased (temporally) as well as detection can occur away from the fiber, the fabric made therefrom or the object containing the fiber and/or its activation source (spatially).

As used herein "CAS #" is a unique numerical identifier assigned to every chemical compound, polymer, biological sequences, mixtures and alloys registered in the Chemical Abstracts Service (CAS), a division of the American Chemical Society.

As used herein "fiber" means a filament of finite length or of a continuous structure and includes multicomponent compositions including core/sheath, eccentric core/sheath, trilobal core/sheath, side-by-side, mixed viscosity side-by-side, ABA side-by-side, trilobal side-by-side, tipped trilobal, tipped cross, segmented pie micro-denier, islands-in-the-sea micro-denier, striped micro-denier, and combinations thereof, including hollow constructs.

Not to be held to theory, it is believed that, the selected photoluminescent phosphorescent materials absorb incident activating electromagnetic radiation, for example, ultraviolet and/or visible portions of the electromagnetic spectrum, and an electron is excited from a ground state into an excited state. The excited state electron of a phosphorescent material undergoes a conversion called intersystem crossing wherein the electron is trapped in the excited state and only slowly returns to the ground state with a subsequent emission of electromagnetic radiation, for example, in the visible region of the electromagnetic spectrum. The time for emission to occur from the excited state of phosphorescent materials can be on the order of $10^{-3}$ seconds to hours and even days. In this manner emission radiation from excited phosphorescent materials can continue long after the incident radiation has ceased.

The energy of the emission radiation from a photoluminescent material is generally of lower energy than the energy of the incident activating radiation. This difference in energy is called a "Stokes shift".

Phosphorescent materials suitable for the current invention include, for example, the well known metal sulfide phosphors such as ZnCdS:Cu:Al, ZnCdS:Ag:Al, ZnS:Ag:Al, ZnS:Cu: Al as described in U.S. Pat. No. 3,595,804 and metal sulfides that are co-activated with rare earth elements such as those describe in U.S. Pat. No. 3,957,678 as well as the alkaline earth aluminate phosphors doped with europium and often comprise one or more co-activators such as elements of the Lanthanide series (e.g. lanthanum, cerium, praseodymium, neodymium, samarium, gadolinium, terbium, dysprosium, holmium, erbium, thulium, ytterbium, and lutetium), tin, manganese, yttrium, or bismuth. Examples of such photoluminescent phosphors are described in U.S. Pat. No. 5,424, 006.

Other phosphorescent materials useful in the current invention include the alkaline earth aluminate oxides having the formula MO.mAl$_2$O$_3$:Eu$^{2+}$,R$^{3+}$ wherein m is a number ranging from 1.6 to about 2.2, M is an alkaline earth metal (strontium, calcium or barium), Eu$^{2+}$ is an activator, and R is one or more trivalent rare earth materials of the lanthanide series (e.g. lanthanum, cerium, praseodymium, neodymium, samarium, gadolinium, terbium, dysprosium, holmium, erbium, thulium, ytterbium, lutetium), yttrium or bismuth co-activators. Examples of such phosphors are described in U.S. Pat. No. 6,117,362, as well as the alkaline earth aluminate oxides having the formula M$_k$Al$_2$O$_4$:2xEu$^{2+}$, 2yR$^{3+}$ wherein k=1−2x−2y, x is a number ranging from about 0.0001 to about 0.05, y is a number ranging from about x to 3x, M is an alkaline earth metal (strontium, calcium or barium), Eu$^{2+}$ is an activator, and R is one or more trivalent rare earth materials (e.g. lanthanum, cerium, praseodymium, neodymium, samarium, gadolinium, terbium, dysprosium, holmium, erbium, thulium, ytterbium, lutetium), yttrium or bismuth co-activators. Examples of such phosphors are described in U.S. Pat. No. 6,267,911 B1.

Other phosphorescent materials suitable for this invention are alkaline earth aluminates of the formula MO.Al$_2$O$_3$.B$_2$O$_3$:R wherein M is a combination of more than one alkaline earth metal (strontium, calcium or barium or combinations thereof) and R is a combination of Eu$^{2+}$ activator, and at least one trivalent rare earth material co-activator, (e.g. lanthanum, cerium, praseodymium, neodymium, samarium, gadolinium, terbium, dysprosium, holmium, erbium, thulium, ytterbium, lutetium), bismuth or manganese. Examples of such phosphors can be found in U.S. Pat. No. 5,885,483.

Phosphorescent materials described above generally absorb in the UV or near UV/Visible regions of the electromagnetic spectrum with subsequent emissions from 390-700 nm.

As can be appreciated, many other phosphors are useful to the present invention. Such useful phosphors are described in Yen and Weber, *Inorganic phosphors: compositions, preparation and optical properties*, CRC Press, 2004.

Not to be held to theory the selected photoluminescent fluorescent materials absorb incident activating electromagnetic radiation, for example, ultraviolet, visible and/or infrared portions of the electromagnetic spectrum and an electron is excited from a ground state into an excited state. In the case of such photoluminescent fluorescent materials the electron returns rapidly to the ground state with subsequent release of electromagnetic radiation, for example, ultraviolet, visible and/or infrared radiation. The time for emission to occur from the excited state in photoluminescent fluorescent materials can be on the order of $10^{-8}$ seconds. Continued emission from photoluminescent fluorescent materials ceases when the activating energy ceases. The energy of the emission is generally lower than the energy of the incident activating radiation.

Selected photoluminescent fluorescent materials useful in the current invention include photoluminescent fluorescent materials that absorb in the visible and/or infrared and emit in the visible and/or infrared. For example, photoluminescent fluorescent materials that absorb in the visible and emit in the visible include, for example, coumarins such as coumarin 4, coumarin 6, and coumarin 337; rhodamines such as rhodamine 6G, rhodamine B, rhodamine 101, rhodamine 19, rhodamine 110, and sulfarhodamine B; phenoxazones including Nile red and cresyl violet; styryls; carbostyryls; stilbenes; and fluorescenes. Examples of photoluminescent fluorescent materials that absorb in the visible region of the electromagnetic spectrum and emit in the far visible and infrared regions include, for example, Nile Blue, IR 140 (CAS #53655-17-7), IR 125 (CAS #3599-32-4), and DTTCI (CAS #3071-70-3). Below in Table 1 are the absorption and emission characteristics of some of the photoluminescent fluorescent materials suitable for the current invention.

TABLE 1

| Fluorescent | CAS # | Max. Absorbance (nm) | Max. Emission (nm) |
| --- | --- | --- | --- |
| Coumarin 6 | 38215-35-0 | 458 | 505 |
| Rhodamine 110 | 13558-31-1 | 510 | 535 |
| Rhodamine 19P | 62669-66-3 | 528 | 565 |
| Rhodamine 6G | 989-38-8 | 530 | 556 |
| Nile red | 7385-67-3 | 550 | 650 |

TABLE 1-continued

| Fluorescent | CAS # | Max. Absorbance (nm) | Max. Emission (nm) |
|---|---|---|---|
| Nile blue | 53340-16-2 | 633 | 672 |
| IR 676 | 56289-64-6 | 676 | 720 |

IR-676 is 1,1',3,3,3',3'-Hexamethyl-4,5,4',5'-dibenzoindodicarbocyanine

When photoluminescent phosphorescent materials are admixed with selected photoluminescent fluorescent materials, the emission of the photoluminescent phosphorescent materials can be absorbed by the photoluminescent fluorescent materials with subsequent emission which exhibit a downward Stokes shift to energy lower than the energy used to excite the photoluminescent phosphor. The emission energy from the photoluminescent fluorescent material can be absorbed by a second photoluminescent fluorescent material selected for its ability to absorb such radiation. The second photoluminescent fluorescent material will exhibit a downward Stokes shift to energy lower than the energy emitted from the first photoluminescent fluorescent material. Additional photoluminescent fluorescent materials can be chosen to further exhibit Stokes shifts until a selected emission is achieved. The selected emission can be chosen to be partially or fully in the infrared regions of the electromagnetic spectrum. Generally, a Stokes shift for a single photoluminescent phosphorescent or photoluminescent fluorescent material ranges from 20 to 100 nm. In order to produce longer Stokes shifts, multiple photoluminescent fluorescent materials can be used to produce a cascading Stokes shift. A cascading Stokes shift is produced by successive absorptions of the emission of one of the photoluminescent materials by another of the photoluminescent fluorescent materials and re-emission at a longer wavelength. When done multiple times Stokes shifts significantly in excess of 50 nm can be created.

The photoluminescent phosphorescent materials and the photoluminescent fluorescent materials may be admixed or they may be separated into different layers with the layer containing the fluorescent material situated outwardly toward the observer. Activating energy penetrates the outer fluorescent surface to activate the phosphorescent materials below whose emission activates the fluorescent material in the outer layer.

The quantum efficiency of compositions comprising photoluminescent phosphorescent and/or photoluminescent fluorescent materials will be dependent on a number of factors, such as degree of overlap between the emission spectrum of one of the photoluminescent materials with the absorption spectrum of another of the photoluminescent materials and the degree to which the photoluminescent fluorescent materials are molecularly dispersed in the polymer comprising the binding matrix. In order for the photoluminescent fluorescent materials to be molecularly dispersed in the polymer or exist as a solid state solution in the chosen polymer or polymers, it is essential for the photoluminescent fluorescent materials to be in solution in the liquid carrier medium and be compatible with the chosen polymers.

Selected admixing of photoluminescent phosphorescent materials with photoluminescent fluorescent materials, or layers made therefrom, will result in compositions that can be charged or activated by incident electromagnetic energy, for example, by ultraviolet, visible, or combinations thereof, and emit partially or fully in the infrared. Since the activated photoluminescent phosphorescent material will continue to emit radiation long after the activating radiation has been removed, the photoluminescent composition will continue to emit radiation partially or fully in the infrared region of the electromagnetic spectrum.

It can readily be seen that activation of the inventive fibers and detection of their subsequent emission can occur at separate times and at separate places. Thus, the fibers, fabrics made therefrom, and objects containing the fiber can be charged with electromagnetic radiation. The radiation can be shut off and the fibers, fabrics made therefrom, and objects containing the fiber can be moved to a different place while the emissions continue to occur enabling detection to occur long after activation has ceased.

Selected photoluminescent fluorescent materials can additionally be incorporated into the photoluminescent compositions containing the above described photoluminescent phosphorescent and photoluminescent fluorescent materials to optimally couple the excitation source and the absorbance spectrum of a selected photoluminescent material that is to be initially activated from an external electromagnetic radiation source.

The photoluminescent fluorescent materials of the current invention that exhibit this property can be admixed into the photoluminescent composition containing the phosphorescent materials or they can reside in a fiber sheath coating either above or below such photoluminescent composition, or both.

For optimal performance of luminescent materials for high intensity and persistence, specific photoluminescent materials and mixtures of such materials need to be adapted for use in varying conditions, for example, excitation conditions or environmental considerations. Water-resistant compositions suitable for protecting the photoluminescent phosphorescent particles and compositions that minimize photolytic degradation are sought-after. Beyond the selection of the photoluminescent phosphorescent materials and/or any additional photoluminescent fluorescent materials used to enhance their performance, it should be noted that the emission intensity and/or persistence from a photoluminescent composition is greatly affected by both the way in which the photoluminescent phosphorescent materials are distributed and the additives used, as well as the manner in which that composition is applied.

The improper selection and use of the composition materials, such as binders, dispersing agents, wetting agents, rheology modifiers, photostabilizers, and the like can diminish the emission intensity emanating from the composition. This can occur, for example, due to agglomeration or settling of photoluminescent phosphorescent particles, either during handling of the formulated materials or after application of the formulated materials. The reduction in emission intensity and/or persistence can result from incomplete excitations and/or scattering of emitted radiation. The scattering of photoluminescent emissions can be either due to agglomeration of photoluminescent phosphorescent material or as a consequence of electromagnetic radiation scattering by one or more of the additives selected to stabilize the photoluminescent phosphorescent pigment dispersion. The net result will be lower emission intensity and persistence.

The use of colorants in the form of pigments that are absorptive of visible electromagnetic radiation, in order to impart daylight color to photoluminescent compositions, even when such pigments are not absorptive of photoluminescent emissions, can result in degradation of photoluminescent intensity and persistence by virtue of either scattering of photoluminescent emissions or by inadequate charging of photoluminescent phosphorescent materials. Hence, for attaining maximum emission intensity, use of absorptive pigments should be avoided. It should be noted however that creation of stealth markings can be aided by the selective use of absorptive pigments designed to adjust the daylight color of the markings so that a photoluminescent marking will blend in with the surrounding areas so as to be unnoticeable under normal conditions. By keeping the amount of pigment used low, one can minimize any negative impact on the emission intensity and persistence of the emission signature.

As mentioned earlier, for stealth identification the emission is not ordinarily observable by a human observer. It should be noted, however, that there is a wide range of capability in humans for the detection of visible radiation. Hence, for highly sensitive applications, wherein it is desirable that there be no circumstance wherein even a human observer with acute vision cannot detect any emission, even after long adaptation to nighttime conditions, and standing very close to the object with the photoluminescent marking, one can ensure a high degree of stealth detection by incorporating a visible light absorptive pigment, either in the photoluminescent fiber cores or in a sheath layer over the photoluminescent fiber core.

It is important to select only those polymeric binder resins for the photoluminescent materials that do not absorb electromagnetic radiation within the excitation spectrum of the chosen photoluminescent material and that are also compatible with the selected photoluminescent materials. This is important, for otherwise, the excitation of the photoluminescent materials will be inhibited. It is also desirable that the chosen polymeric materials should have minimal impact on the emission intensity, that is, it should not exhibit any significant quenching of the photoluminance. Binder resins suitable for the inventive compositions include acrylates, for example NeoCryl® B-818, NeoCryl® B-735, NeoCryl® B-813, and combinations thereof, all of which are solvent soluble acrylic resins available from DSM NeoResins®, polyvinyl chlorides, polyurethanes, polycarbonates, polyesters, and nylons such as Nylon 6 or Nylon 6,6 and combinations thereof.

The photoluminescent materials may also be included in fiber-glass and/or polysiloxane constructions both as a blend and in core/sheath or other fiber applications.

The liquid carrier can be, for example, any solvent which does not adversely impact the photoluminescent materials and which allows for the solubility of the photoluminescent fluorescent materials selected for the photoluminescent composition. In selecting the liquid carrier, for cases wherein the polymer is soluble in the liquid carrier, the polymeric solution should be clear and should not exhibit any haze, otherwise, emission intensity transmission will be adversely impacted. In general, highly polar solvents will increase the likelihood of emission quenching, and hence should, in general, be avoided. Suitable liquid carriers include glycols, glycol ethers, glycol acetates, ketones, hydrocarbons such as toluene and xylene.

Photostabilizers useful in the inventive composition include UV absorbers, singlet oxygen scavengers, antioxidants, and or mixtures, for example, Tinuvin® 292, Tinuvin® 405, Chimassorb® 20202, Tinuvin® 328, or combinations thereof, all from Ciba® Specialty Chemicals.

Suitable rheology modifiers include polymeric urea urethanes and modified ureas, for example, BYK® 410 and BYK® 411 from BYK-Chemie®.

Dispersants suitable for the inventive compositions include acrylic acid-acrylamide polymers, salts of amine functional compounds and acids, hydroxyl functional carboxylic acid esters with pigment affinity groups, and combinations thereof, for example DISPERBYK®-180, DISPERBYK®-181, DISPERBYK®-108, all from BYK-Chemie® and TEGO® Dispers 710 from Degussa GmbH.

Other additives can be incorporated into the inventive compositions, including wetting agents such as polyether siloxane copolymers, for example, TEGO® Wet 270 and non-ionic organic surfactants, for example TEGO® Wet 500, and combinations thereof; and including deaerators and defoamers such as organic modified polysiloxanes, for example, TEGO® Airex 900.

According to the present photoluminescent compositions components can be from about 10%-50% of binder resin, about 15%-50% of liquid carrier, 2%-35% photoluminescent phosphorescent material, 0.5%-5.0% dispersing agent, 0.2%-3.0% rheology modifying agent, 0.1%-3.0% photostabilizer, 0.2%-2.0% de-aerating agent, 0.2%-3.0% wetting agent, and 0.1%-2.0% photoluminescent fluorescent material.

Fibers of the current invention may be made by any of the known methods of fiber manufacture including solution spinning, melt spinning, melt extrusion and injection molding. In the current invention a monofilament fiber may be spun from a fiber composition containing both photoluminescent phosphorescent materials and photoluminescent fluorescent material. In the current invention the fiber may be formed into a core/sheath configuration in which the core contains both the photoluminescent phosphorescent and the photoluminescent fluorescent materials and other components of the composition, as described above, and the sheath contains the same composition, or a different composition, but without any photoluminescent materials. The core may contain only photoluminescent phosphorescent materials and the sheath may contain the photoluminescent fluorescent materials. The core may contain both photoluminescent phosphorescent materials and photoluminescent fluorescent material while the sheath may also contain photoluminescent fluorescent materials. Some of the fluorescent materials may absorb charging radiation and emit radiation useful in charging the photoluminescent phosphor materials in the core, which then emit radiation that the fluorescent materials use to give an infrared emission signature. In each of these constructions the photoluminescent materials are chosen such that, as described above, the emission signature is fully or partially in the infrared region of the electromagnetic spectrum.

The sheath may also contain optimized amounts of colorant in order for the fiber to blend in with other fibers, or object materials, with which the fiber will be associated, so as not to be visibly distinguishable from them.

Other fiber constructions of the current invention include an inner core of a core/sheath/sheath construction containing non-photoluminescent materials such as a conductive core, a fiber strengthening core, a fiberglass core, a reflective core or other core composed of materials designed to give desirable characteristics to the fiber. The first sheath can be composed of one of the photoluminescent compositions used described above which were used in the core and the second sheath can be composed of one of the sheath materials described above, either photoluminescent or non-photoluminescent.

All of the fibers of the current invention as described above may also include a further sheath onto the core/sheath or core/sheath/sheath constructions designed to give desirable characteristics to the fiber such as mechanical strength, abrasion resistance, visible coloration desirable for certain applications such as, for example, blending inconspicuously with other fibers; protection of the fiber, such as, for example, from chemicals or moisture and from photolysis; and enhanced daylight visibility of the infrared emission signature. It should be noted that, for highest efficiency, the emission from the fiber is directed outwardly from the fiber and not length-wise down the fiber as is typical of fiber optical constructions. Thus the refractive index differences between the core and all the sheaths should be kept to a minimum.

The core may be an optical fiber around which is coated the various sheaths of photoluminescent compositions, as described above, to provide for another embodiment of the inventive fibers.

Fibers of other configurations are suitable for the current invention. For example, island-in-the-sea can be composed of island fiber wherein one or more of the island fibers contain both photoluminescent phosphorescent materials and photoluminescent fluorescent material while the sea may also contain non-luminescent materials, or the island contain only the photoluminescent phosphorescent materials and the sea contains the photoluminescent fluorescent materials. However the islands may contain both photoluminescent phosphorescent materials and photoluminescent fluorescent material while the sea may contain photoluminescent fluorescent materials. The photoluminescent materials are chosen such that, as described above, the emission signature is fully or partially in the infrared region of the electromagnetic spectrum. Some of the fluorescent materials may absorb charging radiation and emit radiation useful in charging the photoluminescent phosphor materials in the core, which then emit radiation that the chain of fluorescent material uses to give an infrared emission signature. In other configurations, some of the islands may be non-luminous but are included to provide other desirable fiber characteristics, such s strength, conductivity and the like.

While these configurations are just a few examples of fiber constructions of the current invention, other configurations in which photoluminescent phosphorescent materials and the photoluminescent fluorescent materials are in the same composition, or separated in multicomponent configurations or the photoluminescent phosphorescent materials and the photoluminescent fluorescent materials are in the same composition and additional photoluminescent materials are present in other portions of the multicomponent fiber, the end result is an emission signature fully or partially in the infrared region of the electromagnetic spectrum.

Methods to prepare photoluminescent fabrics or objects containing the fabric or fibers using the present inventive compositions and which emit either wholly or partially in the infra red can encompass a variety of techniques for application of the photoluminescent fibers described above either onto or into fabrics or objects. For example, techniques wherein the compositions described above can be applied into fabrics include weaving the fibers using a number for processes readily known the art. Further the fiber may be woven into the fabric along with non-luminescent fibers to give a fabric with a known, predetermined photoluminesce pattern fully or partially in the infrared. Fibers may be used to embroider a pattern, mark, identification, etc onto or into a fabric or other substrate.

Photoluminescent fibers, fabrics made therefrom, and objects containing the fiber and which emit either wholly or partially in the infra red can also be prepared by incorporating the fibers, described above, into the objects by including the photoluminescent fibers in the manufacture of the object. For example, for plastic objects that can be prepared by extrusion, any of the fibers described above can be added to the object's composition at from 2 to 30% of the total composition and extruded to give an object which can be identified or detected by the inventive method. Preparation of photoluminescent objects wherein the fibers are included in the manufacture of the object can include a variety of manufacturing techniques such as molding, extrusion, etc. For purposes of identification, detection and authentication, an object need only be partially coated with the photoluminescent composition.

The inventive fibers may be chopped into smaller pieces and combined with other materials and processed to provide objects that photoluminesce fully or partly in the infrared portion of the electromagnetic spectrum.

The above described photoluminescent fibers, fabrics made therefrom, and objects containing the fiber can be charged or activated with electromagnetic radiation, for example, ultraviolet, near ultraviolet or combinations thereof, by a number of convenient methods including metal halide lamps, fluorescent lamps, or any light source containing a sufficient amount of the appropriate visible radiation, UV radiation or both, as well as sunlight, either directly or diffusely, including such times when sunlight is seemingly blocked by clouds. At those times sufficient radiation is present to charge or activate the fibers, fabrics made therefrom, and/or objects containing the fiber. The source of activation can be removed and the fibers, fabrics made therefrom, and/or objects containing the fiber will continue to emit radiation in the selected region and be detected, for example, in darkness when there is no activating radiation.

It should be clearly pointed out that the photoluminescent fibers, fabrics and objects made therefrom enable spatial and temporal decoupling of the photoluminescent layer and enables stealth detection. When these marking, whether stealth or not, are activated, emission continues long after the activating energy has been removed or turned off, allowing for detection to occur at a later time, and under stealth conditions. Because the emission continues after activation, the marking, or object containing the marking, can be moved far away from the activating source and detected under stealth conditions, that is, the marking does not need to be activated during detection and furthermore the emission from the marking is not detectable with the naked eye.

Since the fibers, fabrics made therefrom, and/or objects containing the fiber will continue to emit the desired radiation, charging of the fibers, fabrics made therefrom, and/or objects containing the fiber and detection of the emission signature are spatially and temporally decoupled, that is, the detection step can occur at a time and place separate from the activation step. This allows the fibers, fabrics made therefrom, and/or objects containing the fiber either to be charged and removed from the site of activation or to be charged with subsequent removal of the charging source. Further, detection can occur at a distance from the fibers, fabrics made therefrom, and/or objects containing the fiber object and/or the activating source.

For the purpose of identification or authentication, a detector that will detect the selected emission signature from the photoluminescent fibers, fabrics made therefrom, and/or objects containing the fiber is used. Such detectors may or may not have capability of amplifying the photoluminescent emissions. An example of a detection apparatus with amplification is night vision apparatus. Night vision apparatus can detect either visible radiation if present, infrared radiation, or both visible and infrared radiation. The detection apparatus can be designed to detect specific emission signatures. Where necessary, detectors can incorporate amplification capabilities. The detector can be designed to read a specific wavelength of the emission signature or the fibers, fabrics made therefrom, and/or objects containing the fiber can be created to emit radiation suitable for a specific detector. Because of the nature of the methods and fibers of the current invention, detection can occur at a time and place separate from activation.

Under certain conditions the detection equipment may be adversely impacted by radiation from extraneous sources causing identification or detection of the intended fibers, fabrics made therefrom, and/or objects containing the fiber to be difficult due to the inability of the detector to differentiate between emission signature and such spurious radiation. Under these conditions, the detection equipment, for example, night vision apparatus, may be fitted with a filter designed to eliminate the extraneous visible radiation thereby enhancing identification or detection.

The type of image obtained from the selected emission signature can be in the form of a general imaging emitted by the fibers, fabrics made therefrom, and/or objects containing the fiber or it may be in the form of a pattern in the fabric or objects containing the fiber. It can also have informational properties in the form of alphabetical, numerical, or alphanumeric markings as well as patterns and symbols, such as geometric shapes and designations. In this manner, identification or detection can be topical, either with up-to-date information, such as times and dates, as well as messages.

Identification or detection methods are inclusive of both those methods, wherein the photoluminescent fibers, fabrics made therefrom, and/or objects containing the fiber are used to create photoluminescent markings which enable the emission signature and may be detectable by a human observer and those methods wherein such emissions from such photoluminescent markings are stealth to enable "clandestine" or "stealth" detection. When practicing stealth identification, for the case wherein the emission is only partially in the infrared region of the electromagnetic spectrum, the visible emission component is low enough to be undetectable by a human observer. Identification or detection of the stealth markings described above, either for fibers, fabrics made therefrom, or objects containing the fiber can only be made by using devices designed to detect the selected emission signature.

Identification or detection methods using the current inventive fibers, fabrics made therefrom, and/or objects containing the fiber and embodying clandestine detection can be deployed for detection or identification of objects, people or animals. Photoluminescent fibers, fabrics made therefrom, and/or objects containing the fiber onto or into which such photoluminescent markings can be applied include, for example, military objects to designate friend or foe, as well as trail markings. Such markings are designed to be detected only by selected personnel. Examples of the use of markings for stealth detection include airplane or helicopter landing areas, or markings that reveal the presence or absence of friendly forces.

Identification or detection methods using the current inventive fibers, fabrics made therefrom, and/or objects containing the fiber and embodying both clandestine and non-clandestine markings allow for identification of, for example, stationary combat apparatus, mobile combat apparatus, combat articles of clothing or combat gear either worn by combatants or carried by combatants, tanks, stationary artillery, mobile artillery, personnel carriers, helicopters, airplanes, ships, submarines, rifles, rocket launchers, semi-automatic weapons, automatic weapons, mines, diving equipment, diving clothing, knap-sacks, helmets, protective gear, parachutes, and water bottles.

Identification or detection methods using the current inventive fibers, fabrics made therefrom, and/or objects containing the fiber and embodying both stealth and non-stealth markings allow for identification of, for example, stationary combat apparatus, mobile combat apparatus, combat article of clothing, or combat gear either worn by combatants or carried by combatants, tank, stationary artillery, mobile artillery, personnel carriers, helicopters, airplanes, ships, submarines, rifles, rocket launchers, semi-automatic weapons, automatic weapons, mines, diving equipment, diving clothing, knap-sacks, helmets, protective gear, parachutes, and water bottles.

The current fibers, fabrics made therefrom, and/or objects containing the fiber allow for identification or detection including tagging, tracking and locating transportation vehicles, for example, buses, airplanes, taxi cabs, subway vehicles, automobiles and motorcycles.

Identification or detection methods, using the current inventive fibers, fabrics made therefrom, and/or object containing the fiber and embodying either stealth or non stealth markings, can also be used for applications such as in sports and entertainment, for example, in hunting and fishing applications which are designed to identify or detect other hunters or fisherman. Stealth markings can be particularly useful in hunting applications such as vest, pants, shirt or jacket and the like, wherein accidents can be avoided by using infrared emission detection apparatus for identifying or detecting other hunters but at the same time since no visible emission is detectable, avoiding spooking the hunted animal.

Identification or detection compositions that embody stealth markings may be particularly useful for applications requiring security.

The fibers, fabrics made therefrom, and/or object containing the fiber of the current invention can also be used in anti-counterfeit applications applicable to a wide variety of goods or objects. Photoluminescent fibers, fabrics made therefrom, and/or object containing the fiber prepared according to the methods described above can be utilized in anti-counterfeit applications, for example, currency, anti-piracy applications, such as CDs or DVDs, luxury goods, sporting goods etc. In many of these applications it becomes important that the potential counterfeiter be unaware that the object that is being counterfeited contains a fiber, a fabric made therefrom, and/or object containing the fiber that will authenticate the object. The clandestine marking can also be coded such as a date code or other identifying code that a counterfeited object would not have.

The current fibers, fabrics made therefrom, and/or object containing the fiber can be applied onto carrier materials, such as films, for example, polyester, polycarbonate, polyethylene, polypropylene, polystyrene, rubber or polyvinyl chloride films, or metallic plates, for example, aluminum, copper, zinc, brass, silver, gold, tin, or bronze plates. Other layers can be added to the carrier material such as an adherent material, for example, an adhesive with high or low peel strength or a magnetic material. The carrier material with the photoluminescent fibers, fabrics made therefrom, and/or objects containing the fiber applied thereon can either be attached permanently to an object or it can be transferable so that identification or detection can be changed, updated or removed. Such application allows for an object to have the identification or detection capabilities of the current invention without the object itself undergoing a fabrication process. In this application, if information becomes outdated, the carrier material with the photoluminescent fibers, fabrics made therefrom, and/or objects containing the fiber applied thereon in the form of a removable film or plate can be replaced by another carrier material with the photoluminescent fibers, fabrics made therefrom, and/or objects containing the fiber applied thereon with updated information, for example, in safety applications or security applications.

The current fibers, fabrics made therefrom, and/or objects containing the fiber allow for creation of photoluminescent objects wherein at least some of the photoluminescent fluorescent materials are incorporated in a second photoluminescent layer either above or below a first photoluminescent layer, such first photoluminescent layer comprising photoluminescent phosphorescent materials or photoluminescent phosphorescent and photoluminescent fluorescent materials with the net emission from the object being either wholly or partially in the infra red. It should be noted that such second photoluminescent layers can also serve as a protective coating for the first photoluminescent layer. The fibers, fabrics or compositions containing the fiber can be utilized in any of the layers above.

Objects prepared using the current inventive fibers, fabrics made therefrom, and/or objects containing the fiber can have low emission intensity by virtue of inadequate reflection of the emitted electromagnetic radiation; either because of surface roughness or because of materials in the object that are absorptive of the selected emission signature. As a result reflective layers or coatings that are reflective of the emissions from the photoluminescent compositions can be used as primers to provide a surface from which the emission signature can reflect. Hence a reflective layer may be first applied either onto a carrier material or onto the object itself followed by one or more photoluminescent layers containing the fibers, fabrics made therefrom, and/or objects containing the fiber of the current invention.

Further, certain usages of these fibers, fabrics made therefrom, and/or objects containing the fiber in which adverse environmental conditions are present require protection, for example, protection from wet conditions, resistance to mechanical abrasion, and improved robustness. In these applications use of a protective layer or sheath can be highly beneficial. A protective sheath may also be prepared containing anti-photolysis materials that are designed to protect the underlying photoluminescent materials. Additionally the protective top-coat can be applied to objects that have a reflective coating as described above. Such protective top coats may also comprise some or all of the photoluminescent fluorescent materials.

What is claimed is:

1. A photoluminescent fiber comprising:
a) one or more photoluminescent phosphorescent materials and,
b) one or more photoluminescent fluorescent materials;
wherein the one or more photoluminescent phosphorescent materials absorb and emit electromagnetic energies when charged or activated by either electromagnetic radiation from an excitation source incident upon the phosphorescent materials, or by emission of another photoluminescent material, or both, and wherein the one or more photoluminescent fluorescent materials absorb the emission from the one or more photoluminescent materials and emit electromagnetic energies to give a selected emission signature, such that some or all of the emission signature lies in the infrared portion of the electromagnetic spectrum, the photoluminescent materials being selected so that the emission of one of the photoluminescent materials overlaps with the absorbance of another of the photoluminescent materials, wherein the selected emission signature is the emission from one or more of the selected photoluminescent fluorescent materials, such emission being essentially unabsorbed by any of the other photoluminescent materials.

2. The fiber of claim 1, wherein the fiber comprises a core and a first sheath and wherein the core is comprised of one or more of the photoluminescent phosphorescent material and, optionally, one or more of the fluorescent materials, and the sheath is comprised of one or more of the photoluminescent fluorescent materials.

3. The fiber of claim 2, further comprising a second sheath comprised of one or more of the photoluminescent fluorescent materials.

4. The fiber of any one of claims 1-3 further comprising an outer sheath, wherein the outer sheath comprises at least one of color shifting components, color masking components, fiber protecting components, anti-photolysis components, components for enhancing the daylight visibility of the infrared emission signal or combinations thereof.

5. A fabric made from the fiber of claim 4.

6. A method of using the fabric of claim 5, for stealth detection and identification, the method comprising:
selecting the one or more photoluminescent phosphorescent materials and the one or more photoluminescent fluorescent materials such that the selected emission signature is not visible to a human observer without the use of specific detection equipment.

7. A photoluminescent fiber comprising:
a) one or more photoluminescent phosphorescent materials and,
b) one or more photoluminescent fluorescent materials;
wherein the one or more photoluminescent phosphorescent materials absorb and emit electromagnetic energies when charged or activated by either electromagnetic radiation from an excitation source incident upon the phosphorescent materials, or by emission of another photoluminescent material, or both, and wherein the one or more photoluminescent fluorescent materials absorb the emission from the one or more photoluminescent materials and emit electromagnetic energies to give a selected emission signature, such that some or all of the emission signature lies in the infrared portion of the electromagnetic spectrum, the photoluminescent materials being selected so that the emission of one of the photoluminescent materials overlaps with the absorbance of another of the photoluminescent materials, wherein the selected emission signature is the emission from one or more of the selected photoluminescent fluorescent materials, such emission being essentially unabsorbed by any of the other photoluminescent materials, and wherein the core is reflective of the photoluminescent emission, a strengthening fiber, a conductive fiber or an optical fiber.

8. The fiber of claim 7, wherein the fiber further comprises a second sheath and wherein the first sheath is comprised of one or more of the photoluminescent phosphorescent material and optionally one or more of the fluorescent materials and the second sheath is comprised of one or more of the photoluminescent fluorescent materials.

9. The fiber of claim 8, further comprising a third sheath comprised of one or more of the photoluminescent fluorescent materials.

10. The fiber of any one of claims 7-9, further comprising an outer sheath, wherein the outer sheath comprises at least one of color shifting components, masking components, fiber protecting components, or combinations thereof.

11. A fabric made from the fiber of claim 10.

12. A method of using the fabric of claim 11, for stealth detection and identification, the method comprising:
selecting the one or more photoluminescent phosphorescent materials and the one or more photoluminescent fluorescent materials such that selected emission signature is not visible to a human observer without the use of specific detection equipment.

* * * * *